July 21, 1959 H. L. HAMANN 2,895,370
SHEET METAL SLIDE FASTENER FOR THREADLESS STUDS
Filed Jan. 23, 1957
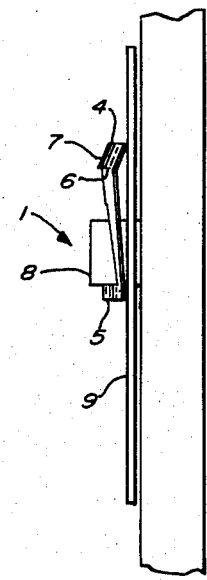
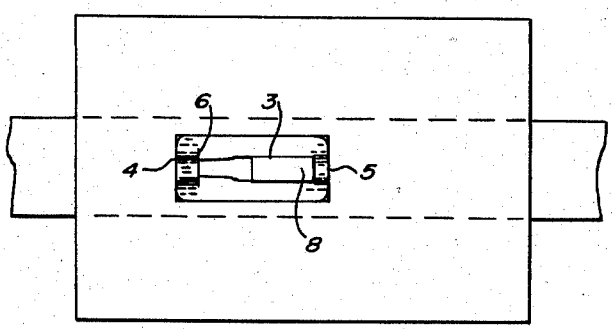
Fig. I    Fig. II
Fig. IV
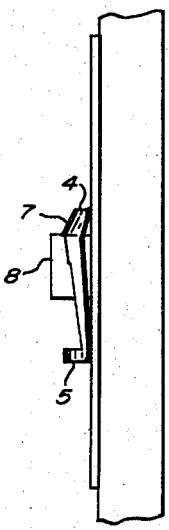
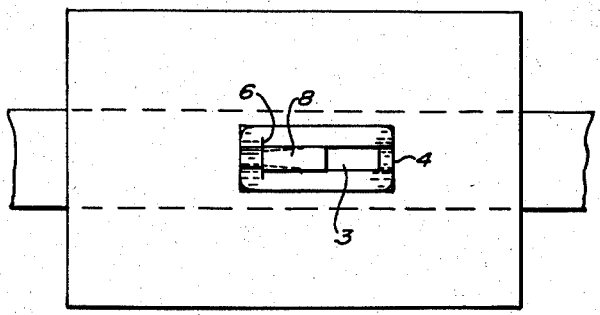
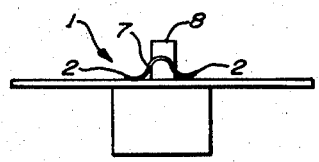
Fig. III    Fig. V
INVENTOR.
HARRY L. HAMANN
BY
ATTORNEYS

United States Patent Office 2,895,370
Patented July 21, 1959

2,895,370

SHEET METAL SLIDE FASTENER FOR THREADLESS STUDS

Harry L. Hamann, Toledo, Ohio, assignor to Production Metal Stamping Company, Toledo, Ohio, a corporation of Ohio Application January 23, 1957, Serial No. 635,670

4 Claims. (Cl. 85—36)

This invention relates to fasteners which are adapted to be applied to bolts, studs and the like as substitutes for nuts and cotter pins and which do not require the bolts or studs to which they are applied to be threaded, pierced or otherwise prepared for the application of the fasteners. Several forms of fasteners of the general type to which the instant invention relates are shown in U.S. Patent No. 2,574,107 dated November 6, 1951.

It is an object of the instant invention to provide a fastener which is especially effective for securing studs of relatively soft material to articles having relatively soft surfaces through which such studs protrude.

It is a further object of the invention to provide a fastening device which is useful for fastening studs of relatively soft material that are rectangular in cross section to articles having relatively soft surfaces through which such studs protrude.

A still further object is to provide a fastener that is useful for fastening relatively soft studs that are rectangular in cross section to articles having relatively soft surfaces through which such studs protrude the fastener being adapted for removal from and replacement upon such studs.

More specifically it is an object of this invention to provide a fastener that is especially adapted for use in fastening studs of plastic material that are rectangular in cross section to articles having easily marred surfaces through which such studs protrude, the fastener being adapted upon removal and replacement to engage fresh areas of walls of such studs.

Other objects and numerous advantages of the invention will be apparent upon perusal of the following description illustrated by the accompanying drawings in which:

Fig. I is a side elevational view showing a fastener embodying this invention about to be pushed endwise into tight engagement with a stud to secure a thin piece of material to a plate;

Fig. II is a plan view of the elements shown in Fig. I;

Fig. III is a side elevational view of the elements shown in Fig. I with the slide fastener pushed into tight engagement with the stud;

Fig. IV is a plan view of the elements in the position in which they are shown in Fig. III; and Fig. V is an end elevation view of the elements in the position in which they are shown in Figs. III and IV.

The figures are on a rather large scale to better illustrate details of construction but in practice the fasteners may range in size from a fraction of an inch long upwardly. These drawings and the following description illustrate and describe a preferred embodiment of the invention but are not intended to impose limitations upon its scope.

The fastener is punched and formed from sheet metal after which it may be heat treated to give it the proper hardness and resilience.

The fastener after fabrication thus consists of an integral piece 1 of spring metal the overall shape of which is polygonal, preferably rectangular, the corners 2 being turned up sufficiently to prevent them from digging into or marring polished surfaces or surfaces of plastic material, paint or soft metal. An elongated slot 3 extends from adjacent one end 4 of the rectangular piece 1 nearly to the other end 5 and short slits 6 extend laterally from the corners of the slot 3 to permit the sides of the slot to flex independently of the end 4, which is arched as indicated at 7 in Fig. V. The end 5 is arched to a lesser extent.

The sides of the slot 3 are parallel as they extend from the end 5 for about two-thirds of their length and this portion of the slot is wide enough to permit the fastener to be slid downwardly over a polygonal, preferably rectangular, stud 8 to which the fastener is to be applied. The portions of the sides of the slot converge toward each other as they approach the end 4 and the arch 7 at the end 4 is so high that the converging sides of the slot slope upwardly as they approach the end 4. The rectangular piece 1 is bowed upwardly so that it engages the surface 9, through which the stud 8 protrudes, only at the turned up corners 2 of the rectangular piece.

When the fastener is to be applied to a rectangular stud 8 protruding through a surface 9 the wide portion of the slot 3 is lowered over the stud 8 until the corners 2 engage the surface 9. Then the fastener is pushed endwise so that the converging portions of the edges of the slot bite into the walls of the stud. Since the converging edges slope upwardly they ride in self-made sloping grooves in the walls of the stud and thus force the corners 2 downwardly into clamping engagement with the surface 9.

The fastener can be forced endwise by tapping it with a light hammer, or by means of pliers, one jaw of which engages the stud 8 while the other jaw engages the end 4 of the fastener. The fastener may be removed by pushing it endwise in the reverse direction until the wide portion of the slot 3 again encompasses the stud 8, whereupon the fastener can be lifted off of the stud.

The slanting grooves cut by the converging edges of the slot 3 extend only about one-half way along the walls of the stud 8 thus leaving fresh areas of the walls into which the converging edges of the slot may bite if the position of the slide is reversed by turning the slide end for end before it is again lowered over the stud.

Because the slide fastener is made of spring metal and because of the arched and bowed conformation of its ends and sides and because the slits 6 permit the converging edges of the slot 3 to flex independently of the end 4 the holding effect of the fastener persists undiminished indefinitely, even though the stud and surface to which the fastener is applied be subjected to severe and prolonged vibration. It functions without damage to either the stud 8 or the surface 9 even though the surface be easily marred and the stud be so weak that it would be broken by the action of a rigid fastener such as a nut or a wedge pin.

Because of the manner in which the converging edges of the slot 3 are made by punching and forming they are sharp enough to bite into metal as well as into plastic material. In cases where the fastener is to be applied to hard surfaces the corners 2 need not be turned up. The fastener may be otherwise modified within the spirit and scope of the subjoined claims.

I claim:

1. A combination of a stud of relatively soft material, said stud having parallel flat walls separated by a given distance, a member through which said stud projects, and a piece of hard resilient sheet metal having an elongated slot therein through which said stud projects, both ends of said slot being closed, a first portion of said slot having an open region exceeding the cross section of the stud to freely pass the stud therethrough, an edge at one end of said slot defining a stop against which an end of said stud intermediate said parallel walls is adapted to bear when said piece is moved laterally across said parallel walls, and converging side edges of said slot sloped upwardly with respect to the major surface of said piece from said first portion of said slot and extending from said first portion toward said stop which are separated by less than said given distance over a length from said stop which is substantially less than and preferably about one-half the length of said stud from said end to the remote end of said parallel walls whereby lateral movement of said piece from one end of said stud will cause said side edges adjacent said stop to bite into the parallel stud walls at said one end without affecting the material of the parallel walls at the opposite end and upon removal of said piece from said one end it can be advanced laterally across said parallel walls from the opposite end so that said side edges will bite into unmarred portions of said parallel walls.

2. A combination in accordance with claim 1 wherein the edges of said slot are parallel along the first portion of said slot.

3. A combination in accordance with claim 1 wherein the corners of said piece are turned upwardly.

4. A combination in accordance with claim 1 wherein the end of said piece adjacent the first end of said slot is somewhat arched and the end of said piece adjacent the second end of said lot is arched to a greater extent than the first end.

References Cited in the file of this patent

UNITED STATES PATENTS

| | | |
|---|---|---|
| 2,355,485 | Tinnerman | Aug. 8, 1944 |
| 2,357,722 | Balduf | Sept. 5, 1944 |
| 2,382,936 | Bedford | Aug. 14, 1945 |
| 2,574,107 | Joy | Nov. 6, 1951 |
| 2,798,406 | Steck | July 9, 1957 |

FOREIGN PATENTS

| | | |
|---|---|---|
| 793,537 | France | Nov. 23, 1955 |